July 10, 1956 V. C. HARRIS 2,754,006
PRE-FILTER FOR USE IN REFINING
Filed Dec. 29, 1953 3 Sheets-Sheet 1
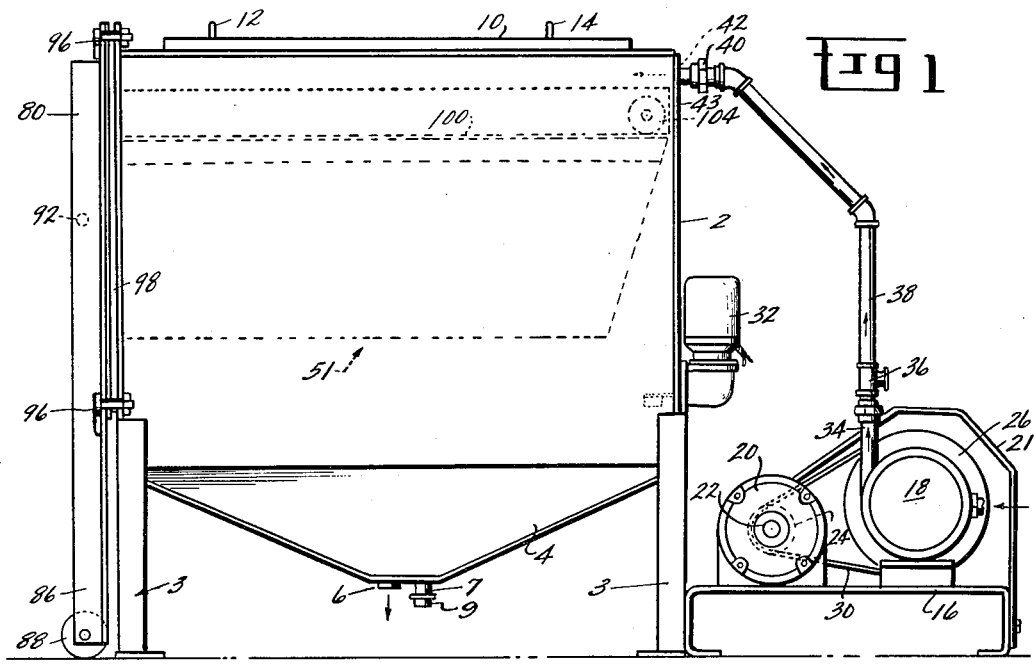
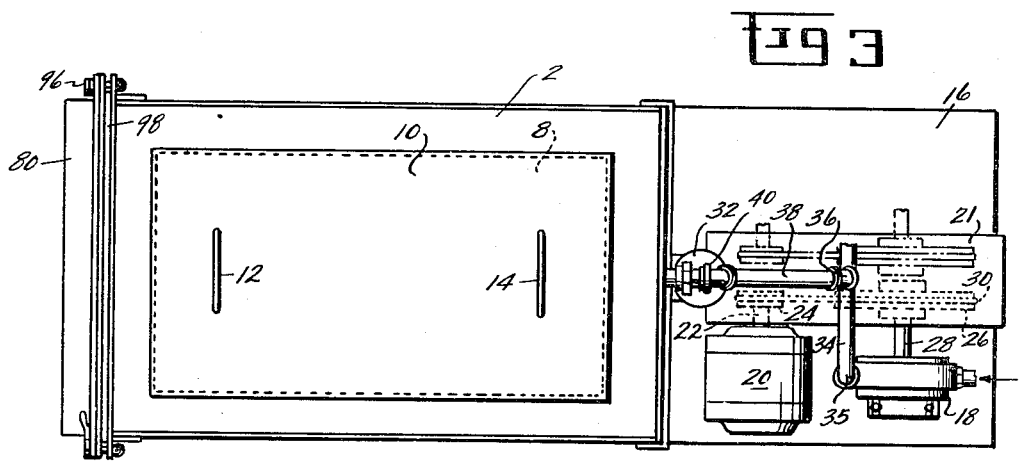
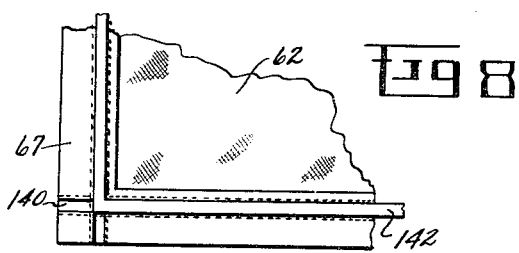
INVENTOR.
VELMA C. HARRIS
BY
John B Brady
ATTORNEY

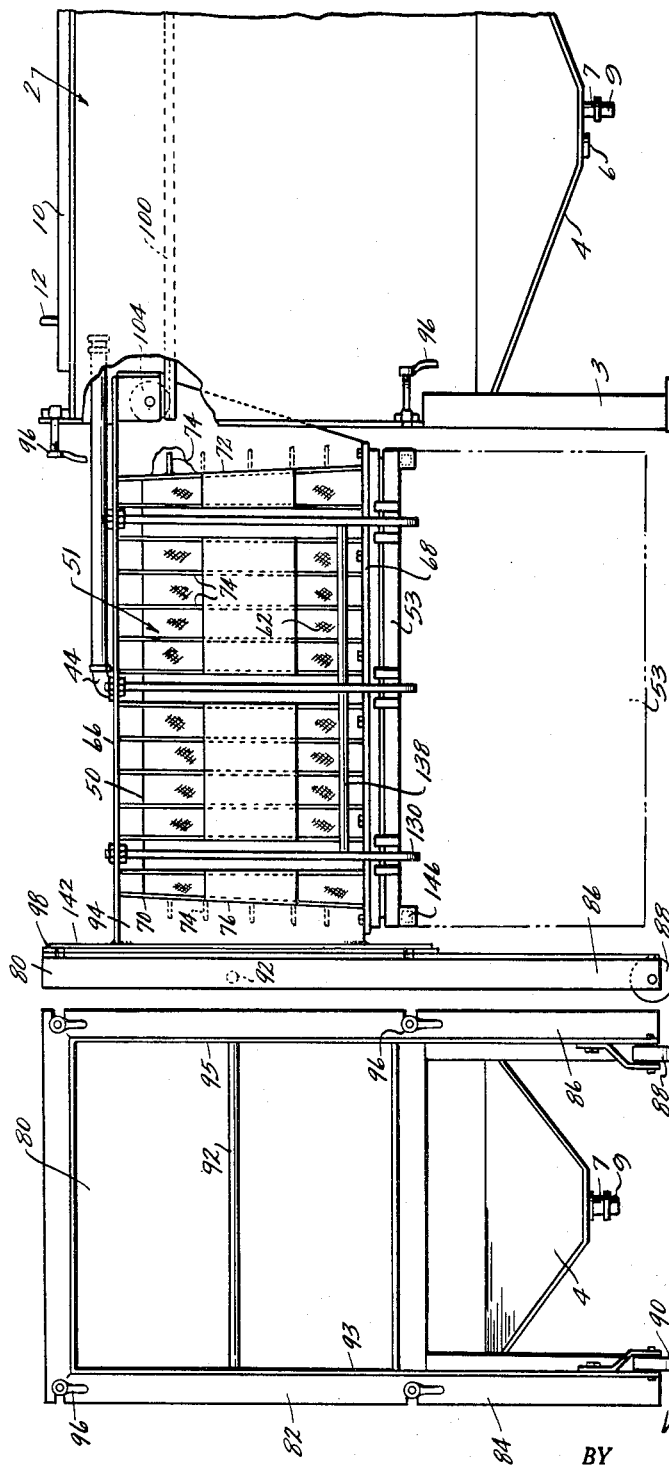

July 10, 1956  V. C. HARRIS  2,754,006
PRE-FILTER FOR USE IN REFINING
Filed Dec. 29, 1953  3 Sheets-Sheet 3
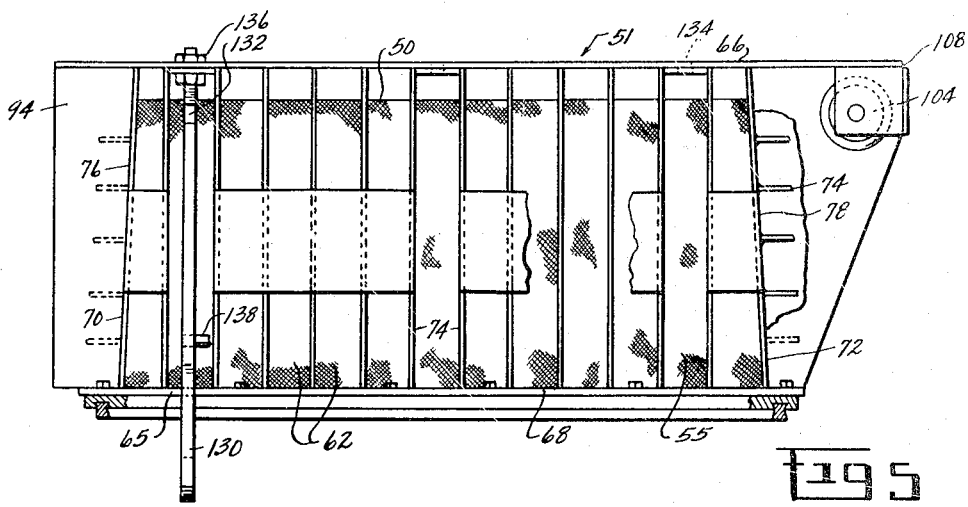
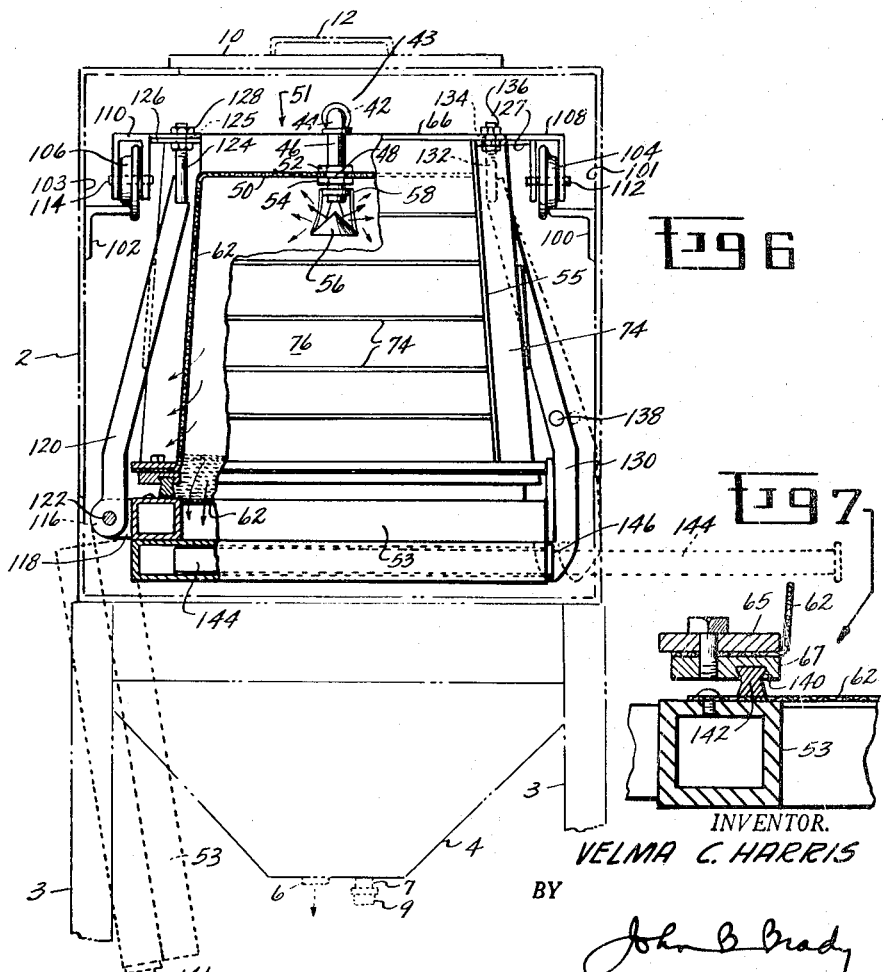
INVENTOR.
VELMA C. HARRIS
BY John B. Brady
ATTORNEY

UNITED STATES PATENT OFFICE 2,754,006
Patented July 10, 1956

2,754,006

PRE-FILTER FOR USE IN REFINING

Velma Claver Harris, Kansas City, Mo.

Application December 29, 1953, Serial No. 400,918

2 Claims. (Cl. 210—187)

My invention relates to that class of devices known as filters and more particularly to pre-filters.

It is well known in the art of refining, cleaning, bleeching, etc., that one of the most suitable final filters is a filter press such as described in Patent No. 2,123,042, granted on July 5, 1938, to W. D. Harris. This type of filter-press is in almost universal use wherever the removal by filtering of very fine collodial metals, carbon or solids is desired; as for example, in filtering out activated clay which has been used to clean and bleach liquid hydrocarbons, like petroleum oil or in the filtering of naphtha, cleaning solvent, transformer oil, vegetable oils, and the like.

Such filter presses employ cloth screens together with filter paper and/or newsprint. However, the frames quickly fill up, necessitating frequent changing. This is realized by industry, and accordingly, banks of several presses are maintained wherever any large volume of fluid is thus filtered. Because the cost of labor to do the work of removing the filter press frames, cleaning out the residual coke, washing the cloth and replacing new or cleaned frames is costly, and because such filter presses are very expensive to purchase and install, a long standing, serious problem has been presented to the industry employing such presses.

I have found in practice that a pre-filter, the screen of which is of the same or somewhat coarser mesh than the material in the final filter, may be used to great advantage.

This pre-filter, manufactured in accordance with my invention, has achieved startling results. By screening out from the material being filtered before it passes to the final filter press, all but the fines that are normally retained by the cloth and filter paper of the final filter, I have extended the time between changes of a set of frames in a filter press up to nine times longer than without the use of my pre-filter. For instance, by the use of my pre-filter in a batch refining process such as described in Patent No. 2,319,598, granted May 18, 1943, to W. D. Harris, which process normally requires the filter press to be changed two or three times per batch of material being treated, I have been able to employ the final filter press continuously, without cleaning, for two and even three entire batches. Because of the beneficial effects of my pre-filter, I have been also able to dispense with the newsprint formerly employed in the final filter press and I have achieved a proportionate saving of filter paper, as well as extra frames, etc.

In practice, I prefer to introduce my pre-filter just before the final filter in the system. By proper piping, this permits an operator to recycle the material being filtered through any part of the system and back through the pre-filter, collecting and retaining any loose solids left in the pipes, tanks, or stills without going through the final filter. I have found that if the material being filtered is thus recycled, astonishing results are achieved. For instance, in the refining process above referred to, I recycled the material from my pre-filter back through the still several times. Under normal operating conditions using only a final filter, the coke in the still had to be cleaned every ten runs or so. By the above recycling use of my pre-filter, I have been able to make as many as one hundred twelve runs without cleaning the retort. The unique construction of my pre-filter enables an operator to clean it without removing any parts and to clean the entire filter by simply dropping a door.

The principal object of my invention is to provide a filter that may be used in a refining system as a pre-filter.

Another object is to provide a filter to lengthen the useful period of a final filter without cleaning.

Another object is to provide a filter that is easily and quickly cleaned. I achieve this object by constructing a filter comprising a tank, a filter cage slidably mounted inside of the tank, and filter material covering the cage. I provide that the bottom of the cage forms a door frame which may be also covered with filter material. When liquid containing solids to be separated is pumped into the filter cage the separated liquid passes into the tank while the solids form a cake inside of the filter cage. By mounting one end of the filter cage to a removable bulkhead in the tank, I provide that the filter cage may be rolled out of the tank and the bottom door opened, allowing the accumulated cake to fall into suitable receptacles.

Another object of my invention is to provide a filter that will not overflow.

Another object of my invention is to provide a filter that does not require disassembly to be cleaned.

A further object of my invention is to provide a filter that can be employed wherever filtering of fluids is accomplished.

A final object of my invention is to provide a filter easily constructed and inexpensive to fabricate.

My means of accomplishing the foregoing objects may be more readily apprehended by having reference to the accompanying drawings, which are hereunto annexed, and are a part of this specification, in which—

Fig. 1 is a side elevation of my filter tank and pumping means;

Fig. 2 is a front view of my filter tank;

Fig. 3 is a top plan view of my filter tank and pumping means;

Fig. 4 is a side view with my filter extended;

Fig. 5 is a side elevation, partly broken away, showing my filter construction;

Fig. 6 is an end view of my filter with the front bulkhead removed showing my filter tank in phantom;

Fig. 7 is a detail view of my discharge door sealing means;

Fig. 8 is a fragmentary view of my discharge door sealing means.

Similar reference numerals refer to similar parts throughout the entire specification.

As shown in the drawings, I provide a tank 2 supported by legs indicated generally as 3. A sump 4 forms the bottom of the tank 2 and has a discharge pipe 6 and a drain pipe 7 covered by a cap 9. The top of the tank 2 has an opening 8 for ready access to the interior. I provide a cover 10 with handles 12 and 14 for the opening 8.

On a base 16 is mounted the usual pump 18 and motor 20 encased in a cover 21. In practice I have found it expedient to provide dual pumps and dual motors, so that the operation may not be caused to cease upon the failure of either a pump or a motor. Accordingly, I provide suitable plumbing in the form of a manifold pipe 34 and a four way T 36. A bypass (not shown) may be installed if desired, which may be actuated by a pressure switch 32. For illustration purposes only I show the electric motor 20 with a drive shaft 22 and a pulley 24 mounted thereon. The pump 18 has a similar pulley 26 mounted on a shaft 28. A drive belt 30 operates the system. Of course any of the many driving means could be equally substituted for the electric motor, belt and pulley arrangements as shown in the drawings.

For safety of operation, I provide a liquid level control switch 32 which will cut off the pump when the level of fluid in the tank 2 reaches a predetermined height. This, of course, will only occur if a stoppage in the system prevents the tank 2 from emptying properly, since the discharge pipe 6 is of equal or greater cross-sectional dimension than that of the outlet side 35 of the pump 18.

A pipe 38 leads from the T 36 to a union 40, through a hole 42 in the rear wall 43 of the tank 2, to an L 44. A nipple 46 leads from the L 44 through a hole 48 in the top 50 of my filter 51. A nipple 46 is held in position by pipe washers 52 and 54 which may be welded into position. A splash nozzle 56 may be attached to the end 58 of the nipple 46 if desired.

My filter 51 may be formed of a screen material 62 within a metal cage 64. I form the cage 64 by welding together an upper frame 66, a lower frame 68 and two end frames 70 and 72. I provide suitable support braces 74 which may be welded between these frames substantially as shown. While there are several materials available I prefer that the brace 74 be made of appropriate lengths of iron or steel. I have found that by making the lower frame 68 of larger circumferential dimension than the upper frame 66, the resulting shape is trapezoidal and the filter 51 is easily emptied of the cake formed during the filtering operation.

In my filter 51, I prefer to have the two end frames 70 and 72 covered by solid metal panels 76 and 78. On these panels 76 and 78 I mount suitable braces 74 which may be welded or otherwise fixed into position as shown.

At the front of the tank 2 I provide a bulkhead 80, supported on a frame 82. The bottom of the legs 84 and 86 of this frame may be bifurcated to accommodate wheels 88 and 90. A handle 92 is provided by a bar attached between the sides 93 and 95 of the frame 82 as shown.

The bulkhead 80 is attached to the front of my filter 51 by a metal spacing member 94. I provide clamps 96 to hold the bulkhead 80 in closed position. A heat gasket 142 is inserted in a key slot in the bulkhead 80 to form a liquid tight seal when closed.

I provide tracks 100 and 102 for rollers 104 and 106. In practice I find it convenient to weld angle-iron pieces to the inner sides 101 and 103 of the tank 2 substantially as shown to form the tracks 100 and 102. The rear of the upper frame 66 is extended to accommodate a pair of yokes 108 and 110 to hold the rollers 104 and 106 by pins 112 and 114. In this manner I provide means for my filter 51 to be extended for cleaning as shown in Fig. 4. The front wheels 88 and 90 on the legs 84 and 86 together with the rollers 106 and 108 on the upper frame 66 riding on the tracks 100 and 102 have proven very satisfactory for this purpose.

The bottom frame 53 of my filter 51 also carries the same screen material 62 as the sides 55 and top 50. The same type of brace 74 is provided for support of the screen material 62 in the bottom frame. The bottom frame 53 is preferably made of two right angle forms welded together in substantially a square in cross section as shown in Fig. 7. Since the bottom frame 53 must carry great weight such construction is deemed desirable.

In order to have the bottom frame 53 function as a discharge door, I provide that a plurality of hinges 116 are formed along one side of the upper frame 53 by means of flanges 118 attached to hangers 120 by pins 122. I shall describe only one such hinge arrangement. The hanger 120 is welded to a bolt 124 in an off-set position as shown in Fig. 6. The bolt 124 is inserted through a hole 125 in the side 126 of the upper frame 66, and is held by means of nuts 128.

I provide catches 130 which are likewise attached to the opposite side 127 of the upper frame 66 by means of a bolt 132 being held in a hole 134 by nuts 136. I have described only one such catch. The catch 130 is sufficiently resilient so that by pulling on the handle bar 138 the discharge door will be allowed to fall downwardly.

The bottom edge 67 of the cage 64 holds the screen material 62 by means of a plate 65 as shown in Fig. 7. A heat gasket 142 is held in a slot 140 in order to provide a liquid tight seal for the discharge door 53 when it is in a closed position. The details of the slot 140 and the gasket 142 are shown in Fig. 8. I provide handles 144 to raise the discharge door 53. They may be inserted into the apertures 146 formed by two right angle pieces welded in the position shown. It will be clear to those skilled in the art that the discharge door 53 need not be the bottom but could, if desired, be one of the other sides or the top.

In operation, my filter loads up with solid matter retained by the screen material 62, the fluid being strained through the screen material 62 and then out between the sides of the cage 64 and into the sump 4 to the discharge pipe 6. At the end of a run or when the solid matter has formed into a cake sufficiently large for it to be uneconomical to continue the run, the flow of fluid into the filter 51 is turned off and the union 40 is broken. The bulkhead 80 is unclamped by loosening the clamps 96 and the filter 51 is rolled out from the tank 2 as shown in Fig. 4. By grasping the handle 138, the catches 130 are pulled out and the discharge door 53 falls downwardly dumping the cake into a suitable receptacle (not shown). By striking the braces 74 with a mallet, any cake not already free is jarred loose and falls into the receptacle. The discharge door 53 is closed and the filter 51 is then rolled back into the tank 2, the bulkhead 80 is fastened by clamps 96, the union 40 is made up and the filter 51 is again ready for service. The operation is speedy, simple and requires no special handling of parts or frames.

While I have described one form of my invention, it will be clear to those skilled in the art that the mechanical features of the filter may be varied as the purpose of the filter varies, without departing from my invention. For instance, if wire screen of 200 mesh is used, the above filter will be adequate. However, if the filter is to be employed where very fine solids are to be filtered, it may be desirable to use as screen material 62, canvas, fibre glass cloth, cotton wool, felt wool, monel metal cloth or ceramic filter screen. Under some conditions, it may be expedient to install a coarse screen material such as hardware cloth to back the lighter filtering material. In such a case, the cage 64 may have different types of braces 74 and there may be less or more of them. Of course, merely the filter material 62 may form the cage 64 if the added support is not required. The broad scope of my invention is to provide a filter which may be easily and quickly cleaned and which will screen out from fluids all but the very smallest fines and thus prolong the useful period of a final filter by removing most of the heavy solids before they reach the final filter.

Having described my invention, what I regard as new and desire to protect by Letters Patent is:

1. A filter for separating solids in a fluid petroleum solution containing solids comprising a vessel having at least one side and a bottom, said bottom forming a hopper adapted to hold separated fluid petroleum, a cage slidably mounted in said vessel, a support upon which said cage is movable outside of said vessel, said cage formed of a top, a bottom and as many sides as the vessel, said cage having at least its top and bottom covered with metal filter cloth, said cage adapted to be fluid tight except where covered by said filter cloth, said cage when covered with said filter cloth being the only filter in said vessel, said filter cloth adapted to separate the coarser solids from fluid petroleum containing solids when said petroleum is passed through said filter cloth, releasable means for supplying said fluid petroleum solution to said cage through the top thereof, whereby the fluid petroleum is separated from said solid matter and passes into said hopper while said solid matter is collected inside said cage, said cage having its bottom hinged to open downwardly to discharge said solid matter collected therein, and means for delivering the separated fluid petroleum from said hopper.

2. A filter for separating solids in a fluid petroleum solution containing solids comprising a substantially rectangular vessel open at the top and having two sides, two ends and a bottom, said bottom forming a hopper adapted to hold separated fluid petroleum, a cage slidably mounted in said vessel and removable endwise therefrom, a support upon which said cage is movable outside of said vessel, said cage formed of a top, a bottom, two sides and two ends, said cage having its top, bottom and sides covered with metal filter cloth, said cage when covered with said filter cloth being the only filter in said vessel, said cage adapted to be fluid tight except where covered by said filter cloth, said filter cloth adapted to separate the coaser solids from fluid petroleum containing solids when said fluid petroleum is passed through said filter cloth, releasable means for supplying said fluid petroleum solution to said cage through the top thereof whereby the fluid petroleum is separated from said solid matter and passes into said hopper while said solid matter is collected inside said cage, said cage having its bottom hinged along one side to open downwardly to discharge said solid matter collected therein, and means for delivering the separated fluid petroleum from said hopper.

References Cited in the file of this patent

UNITED STATES PATENTS

| | | |
|---|---|---|
| 157,593 | Elmenhorst | Dec. 8, 1874 |
| 864,308 | Kelly | Aug. 27, 1907 |
| 955,660 | Moore | Apr. 19, 1910 |
| 1,171,892 | Salisbury | Feb. 15, 1916 |
| 1,244,222 | McCaskell | Oct. 23, 1917 |
| 1,371,634 | McCaskell | Mar. 15, 1921 |
| 1,621,767 | Capra | Mar. 22, 1927 |